United States Patent [19]

Hawerkamp

[11] Patent Number: 4,544,435
[45] Date of Patent: Oct. 1, 1985

[54] HEATABLE WINDING DRUM CONSTRUCTION FOR USE IN MANUFACTURING PLASTIC TUBES AND RECEPTACLES

[76] Inventor: Manfred Hawerkamp, Altenrather Strasse 47, 5210 Troidorf, Fed. Rep. of Germany

[21] Appl. No.: 458,271

[22] Filed: Jan. 17, 1983

[30] Foreign Application Priority Data

Apr. 1, 1982 [DE] Fed. Rep. of Germany ....... 3212141

[51] Int. Cl.$^4$ ...................... B31C 13/00; B65H 81/00
[52] U.S. Cl. .................................. 156/428; 156/195; 156/244.13; 219/469; 264/281; 264/DIG. 68; 425/403; 425/DIG. 7

[58] Field of Search ............... 264/281, 283, DIG. 68; 425/402, 403, DIG. 7; 242/118.32, 68.5; 156/169, 170, 171, 173, 175, 195, 244.13, 428; 219/244, 469, 470, 471

[56] References Cited

U.S. PATENT DOCUMENTS

| 1,624,029 | 4/1927 | Whitcomb | 219/470 |
| 3,185,816 | 5/1965 | Lusebrink | 219/471 |
| 3,482,013 | 12/1969 | Dicks et al. | 264/310 |
| 4,009,236 | 2/1977 | Katsuta | 156/290 |
| 4,349,490 | 9/1982 | Bos | 425/393 |

Primary Examiner—Jan Silbaugh
Assistant Examiner—Hubert C. Lorin
Attorney, Agent, or Firm—McGlew and Tuttle

[57] ABSTRACT

A heatable winding drum construction for use in the manufacture of thermoplastic tubes and receptacles comprises an internal supporting structure for an elongated cylindrical wall with an insulating layer between the supporting structure and the wall.

5 Claims, 2 Drawing Figures

HEATABLE WINDING DRUM CONSTRUCTION FOR USE IN MANUFACTURING PLASTIC TUBES AND RECEPTACLES

FIELD AND BACKGROUND OF THE INVENTION

This invention relates in general to the construction of steel drums and in particular to a new and useful construction of a heatable winding drum of steel for the manufacture of plastic tubes and receptacles.

Prior art winding drums comprise a cylindrical steel wall which, prior to winding on of the strip material, is heated. The strip material also is heated up to a foamable state and may be wound on a heated steel wall, for example, immediately after being extruded. The heating is intended to improve the quality of the wound tubes or receptacles. What is disadvantageous in this direction is that the cylindrical steel wall cools down relatively rapidly, whereby the quality of the produced wound tubes or receptacles is affected. In fact, to obtain the best quality as to strength and stability, a relative slow cooling down of the steel wall is required. In addition, a relatively large amount of energy is needed for heating up the drum, just because of the rapidly cooling steel wall.

To avoid these drawbacks, a winding drum has been provided having a cylindrical steel wall coated on the outside with rubber or a rubber-elastic plastic. Such an outer coating provides a satisfactory thermal insulation toward the outside. This results in saving energy for heating the cylindrical wall of the drum, and at the same time in a retarded cooling of the cylindrical wall of the drum which still is made of steel.

SUMMARY OF THE INVENTION

The invention is directed to a drum having a simple and better thermal insulation of its cylindrical wall and, in addition, further improving the quality of the produced wound tubes and receptacles.

To this end and in accordance with the invention, an insulating layer is provided between the cylindrical wall of the drum and the supporting structure thereof. The invention starts from the experience that a rapid cooling is to be expected particularly on the inside of the cylindrical wall made of steel, since there the heat dissipates primarily and particularly rapidly through the supporting structure which also is of steel. The reason is that the heat dissipates to the ambient atmosphere or air much less than through the supporting steel construction of the drum, since both the heat transfer coefficient and the thermal conductivity of steel are substantially higher than those of air. Consequently, a thermal insulation of the drum cylinder at the side of the supporting structure is particularly effective in saving the considerable amount of energy and retarding the cooling down of the cylindrical steel wall, even if this wall is not coated. The slow cooling of the drum wall carrying an already finished but not yet removed wound tube or receptacle considerably improves the strength and stability, thus the quality, of the product made of a thermoplastic material. In addition, thermal insulation between the cylindrical wall and the supporting structure is easier to make and less expensive than any insulation through an outer coating valve wall.

There are still other features characteristic of the invention, in instances where the supporting structure comprises supporting rings and their internal bracing, the invention provides insulating rings of rubber or rubber-elastic plastic between the cylindrical wall and the supporting rings of the drum. The insulating rings may be secured to the supporting rings, but they also may be simply clamped between the cylinder nad rings. Preferably, the insulating rings have U section and are snuggly engaged on the rings to form with them a structural unit.

According to another embodiment, the supporting rings are coated on their outside with an insulating material. Further, segments of insulating material designed as spacers may be provided between the cylindrical wall and the supporting rings of the drum.

The invention provides a heatable winding drum of steel for manufacturing tubes and receptacles, exhibiting a better thermal insulation and improving the quality of the manufactured products even without an outer coating of rubber or rubber-elastic plastic. Due to the improved thermal insulation, a particularly slow cooling of the heated cylindrical wall is obtained, which produces its favorable effect on the strength of and stability of the wound product. Further, a substantial amount of energy is saved. The inside thermal insulation can be put in place between the supporting structure and the cylindrical wall of the drum in a relatively simple and inexpensive manner.

Accordingly, it is an object of the invention to provide a heatable winding drum of steel which is used for the manufacture of plastic tubes and receptacles which are made up of helically wound strip material of thermoplastic and which comprises an internal support structure for an outer cylindrical wall with an insulating layer between the support structure and the outer cylindrical wall.

A further object of the invention is to provide a winding drum which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment is illustrated.

DESCRIPTION OF THE PREFERRED EMBODIMENT

Figure 1:
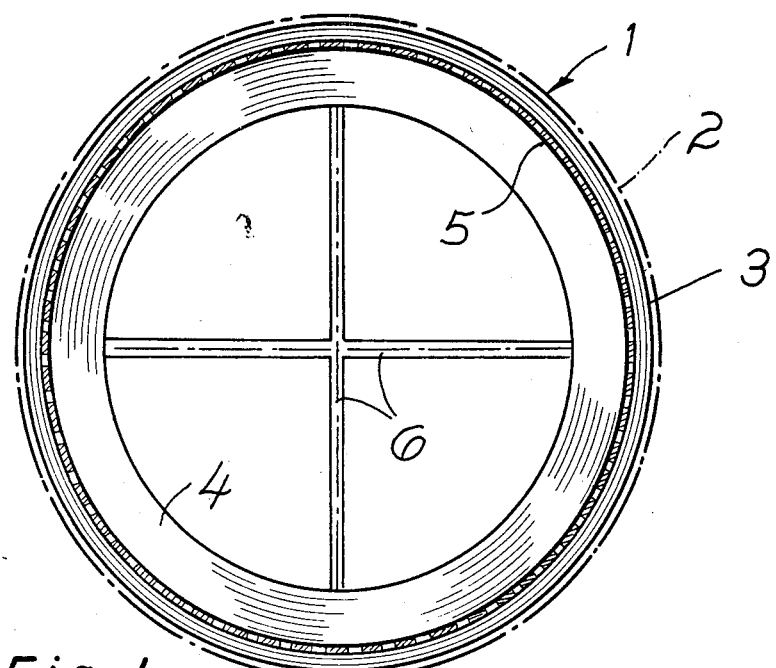
FIG. 1 is a radial sectional view of a winding drum constructed in accordance with the invention.
Figure 2:
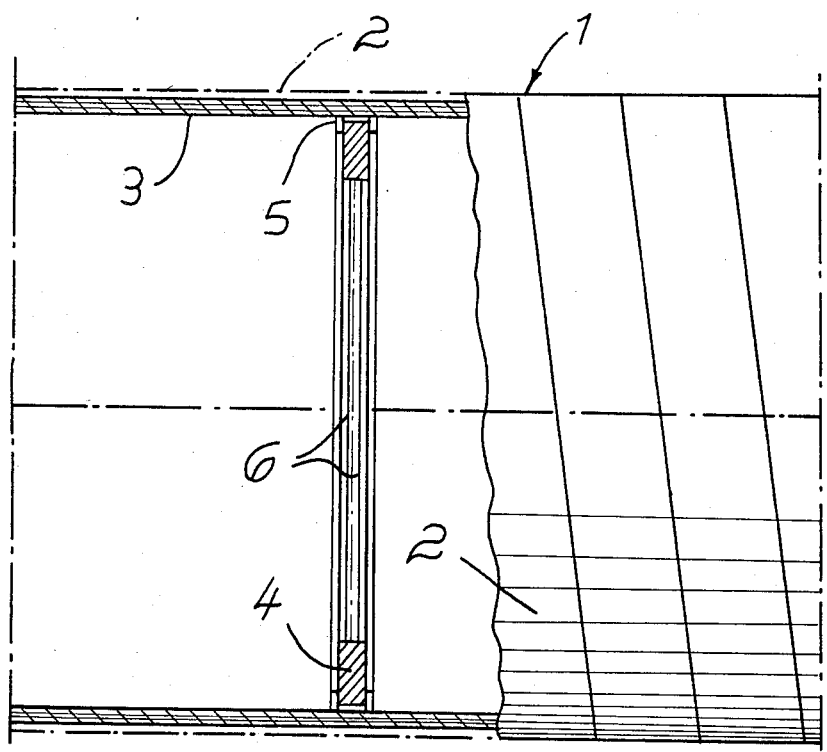
FIG. 2 is a partial side elevational view and axial sectional view of the drum shown in FIG. 1.

Referring to the drawings in particular the invention embodied therein comprises a heatable winding drum made of steel which is used for manufacturing tubes and receptacles which are made up of helically wound strip material of thermoplastics. The strip material is wound on a cylindrical wall 3 of the drum 1 which are arranged in continuous spiral layers and welded at their side edges over the drum wall. According to the invention the drum 1 comprises an internal support structure 4 for the cylindrical wall 3 and an insulating layer 5 between the support structure and the cylindrical wall.

The invention comprises a heatable winding drum 1 of steel, for manufacturing tubes and receptacles of a helically wound thermoplastic strip material 2. In the course of manufacture, strip material 2 is wound onto cylindrical wall 3 of the drum 1 and welded together in the strip side edge abutting zones. The winding drum 1 comprises a supporting structure 4 for relatively long cylindrical wall 3. Both supporting structure 4 and cylindrical wall 3 are made of steel. Between wall 3 and structure 4, an insulation or insulating layer 5 is provided. In the shown example, supporting structure 4 comprises supporting rings 4 and spoke-like bracing member 6 for the rings. Between cylindrical wall 3 and supporting rings 4, insulating layer 5 of rubber or rubber-elastic plastic are provided. Insulating rings 5 are clamped between wall 3 and rings 4. They have U-cross section and embrace supporting rings 4 by their web portion and legs. Insulating rings 5 may also be slipped on supporting rings 4 and act as a spacer between ring 4 and drum 1.

In other embodiments (not shown) supporting rings 4 may be coated on their outside with an insulating material, or segments of insulating material designed as spacers may be inserted between cylindrical wall and supporting rings 4.

While a specific embodiment of the invention has been shown and described in detail to illustrate the application of the principles of the invention, it will be understood that the invention may be embodied otherwise without departing from such principles.

What is claimed is:

1. A heatable winding drum of steel for use in manufacturing helically wound tubes and receptacles made up of wound strips of thermoplastic material, comprising a cylindrical drum wall on an interior of said winding drum, a support structure within said cylindrical drum wall which comprises a plurality of longitudinally spaced support rings each having an outer circumference and a bracing structure within said support rings, and a heat-insulating layer provided between said support rings and said cylindrical drum wall, said heat-insulating layer being made of elastic insulating material disposed on said outer circumference of said support rings and arranged so as to prevent dissipation of heat from the drum wall through said support structure when the drum is heated.

2. A heatable winding drum according to claim 1, wherein said insulating layer comprises a spacer disposed over each support ring.

3. A heatable winding drum according to claim 1, wherein said heat-insulating layer comprises an insulating ring disposed over each support ring.

4. A heatable winding drum according to claim 3, wherein said insulating rings are clamped between said cylindrical support rings and said drum wall.

5. A heatable winding drum according to claim 3, wherein said insulating rings have a U-shaped cross section and are engaged over said support rings between said support rings and said drum wall.

* * * * *